(12) United States Patent
Engin

(10) Patent No.: US 7,841,809 B2
(45) Date of Patent: Nov. 30, 2010

(54) HIGH HELIX/LOW LEAD CUTTING TOOL

(75) Inventor: Serafettin Engin, St-Lambert (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 939 days.

(21) Appl. No.: 11/554,215

(22) Filed: Oct. 30, 2006

(65) Prior Publication Data

US 2008/0101877 A1   May 1, 2008

(51) Int. Cl.
*B23P 15/34* (2006.01)
*B23P 15/00* (2006.01)
(52) U.S. Cl. .......................... 407/53; 407/54
(58) Field of Classification Search ............ 407/53, 407/54, 57, 59, 60, 62, 63
See application file for complete search history.

(56) References Cited

U.S. PATENT DOCUMENTS

| 4,285,618 | A | * | 8/1981 | Shanley, Jr. | ............... 407/54 |
| 4,721,421 | A | * | 1/1988 | Klinger | ............... 407/63 |
| 6,588,990 | B2 | | 7/2003 | Aoki et al. | |
| 6,905,312 | B2 | | 6/2005 | Bourgy et al. | |
| 7,544,021 | B2 | * | 6/2009 | Flynn | ............... 407/59 |

* cited by examiner

*Primary Examiner*—Will Fridie, Jr.
(74) *Attorney, Agent, or Firm*—Ogilvy Renault LLP

(57) ABSTRACT

A milling cutter comprises a shank section joined to a cutting section. The cutting section includes a plurality of peripheral blades separated by a plurality of flutes to form cutting edges extending around the cutting section in a helix direction. The helix angle is relatively large such that an axial cutting force acting on the cutting edge is greater than other cutting forces acting on the same cutting edge and on a plane normal to the axial cutting force.

11 Claims, 3 Drawing Sheets

HIGH HELIX/LOW LEAD CUTTING TOOL

TECHNICAL FIELD

The invention relates generally to rotary milling cutters, and more particularly to improved milling cutters for machining an integral rotor blade disc of a gas turbine engine.

BACKGROUND OF THE ART

Integrally Bladed Rotors (IBR's), also commonly known as "bladed discs" are important parts of gas turbine engines. Manufacturing IBR's is a challenging task due to the complex geometry of airfoil surfaces. Existing methods of manufacturing IBR airfoils include flank milling, point milling, etc. In a flank milling process, the periphery of an end mill, typically a tapered ball end mill, generates the desired airfoil surface geometry through one or more passes of the cutter. The tool used in a point milling process is usually a tapered end style milling cutter, small enough such that the entire diameter of the tool can fit between the airfoils of the IBR. These milling cutters have cutting blades and flutes which either extend straight down the cutter, or can extend around the cutter in a helical direction. The helical blade arrangement is often preferred because when using that type of cutter, a portion of the blade is always in contact with the work piece and the blades tend to slice off cuttings rather than chip them away. The helix angle of such blades is conventionally about 10 to 40 degrees as measured from a line parallel to the rotational axis of the cutter. However, cutting tool geometry is very important to the process stability, repeatability, surface finishing and tool durability under certain cutting conditions on IBR's.

Accordingly, there is a need for optimization of milling cutters for machining IBR airfoils.

SUMMARY OF THE INVENTION

It is therefore an object of this invention is to provide an improved milling cutter.

In one aspect, the present invention provides a milling cutter which comprises a shank section joined to a cutting section, the milling cutter being adapted to rotate about a longitudinal axis of the milling cutter during a milling operation, the cutting section including a hard metal body with a plurality of peripheral blades separated by a plurality of flutes, each of the peripheral blades having a leading side, a cutting edge and a trailing face side, each of the cutting edges defining a helix around the cutting section, a helix angle between the cutting edge and a line parallel to the longitudinal axis of the milling cutter being 50 to 89 degrees.

In another aspect, the present invention provides a milling cutter for machining an Integrally Bladed Rotor (IBR) having a rotor disc with a plurality of integral airfoils projecting outwardly from the rotor disc, the milling cutter comprising a shank section joined to a cutting section, the milling cutter being adapted to rotate about a longitudinal axis of the milling cutter during a milling operation, the cutting section including a hard metal body with a plurality of peripheral blades separated by a plurality of flutes, the cutting section having a transverse cross-section smaller than a circumferential space defined between adjacent airfoils, each of the peripheral blades having a leading side, a cutting edge and a trailing face side, each of the cutting edges extending around the cutting section in a helix direction and defining an helix angle between the cutting edge and a line parallel to the longitudinal axis of the milling cutter, the helix angle being determined such that an axial cutting force acting on each of the cutting edges is greater than other cutting forces acting on the same cutting edges and in a plane normal to the axial cutting force.

Further details of these and other aspects of the present invention will be apparent from the detailed description and figures included below.

DESCRIPTION OF THE DRAWINGS

Reference is now made to the accompanying drawing depicting aspects of the present invention, in which.

DETAILED DESCRIPTION OF THE PREFERRED EMBODIMENTS

Figure 1:
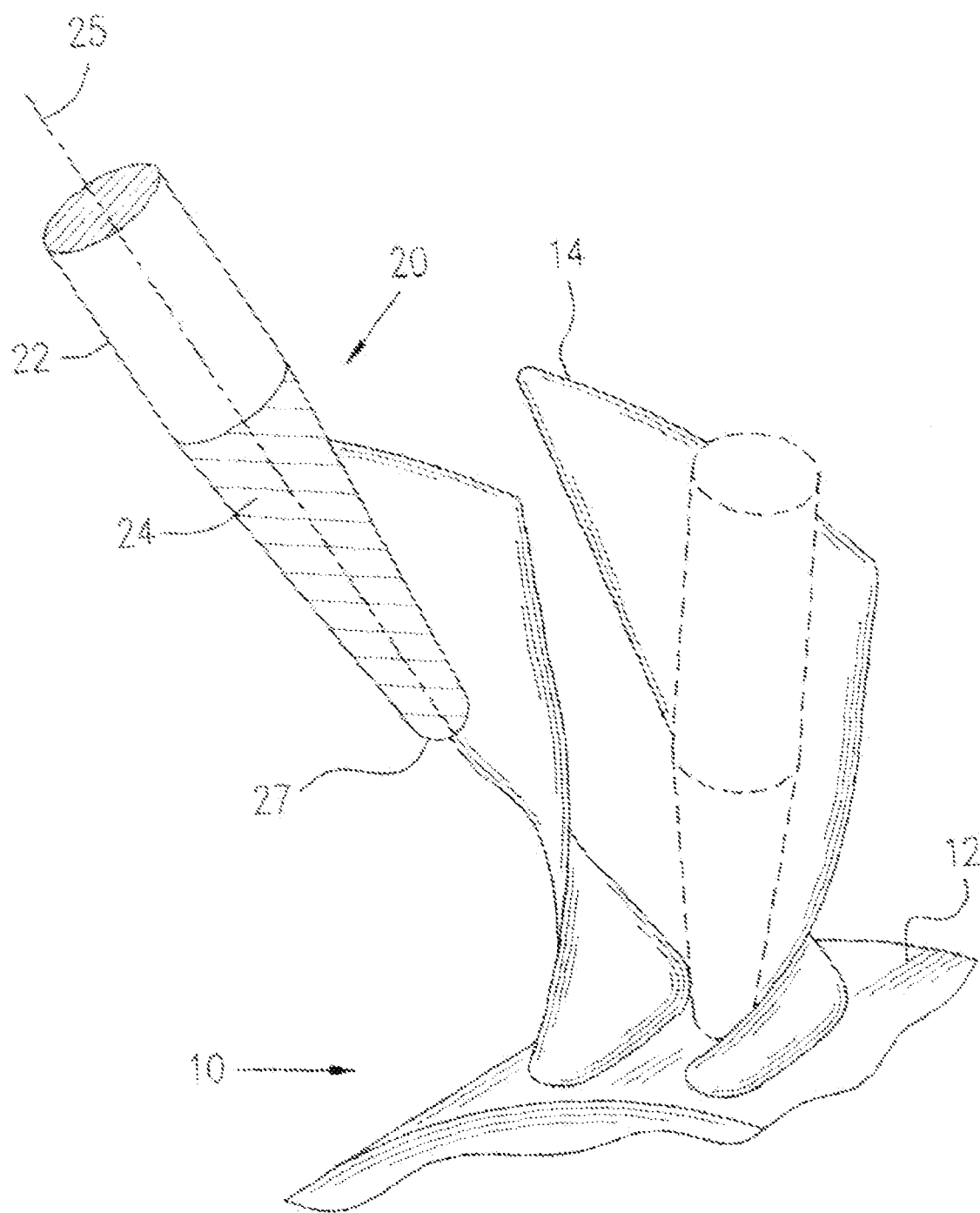
FIG. 1 is schematic illustration of one exemplary application of the present invention, showing a milling cutter of the present invention used for machining an Integrally Bladed Rotor of gas turbine engines.

FIG. 1 schematically illustrates a milling cutter of the present invention generally indicated by numeral 20, used, for example, for machining an Integrally Bladed Rotor (IBR) generally indicated by numeral 10, of a gas turbine engine. IBR 10 comprises a hub 12 and a plurality of integral airfoils 14 projecting substantially radially outwardly therefrom. Manufacturing IBR's is a challenging task not only due to the complex geometry of airfoil surfaces, but also due to the material such as titanium or nickel alloys of which IBR's are usually made.

The milling cutter 20 according to one embodiment of the present invention generally includes a shank section 22 which is preferably substantially cylindrical, joined to a cutting section 24. The milling cutter 20 is adapted to be mounted to a spindle of a milling machine (not shown) to rotate about a longitudinal axis 25 of the shank section 22. The longitudinal axis 25 is also the longitudinal axis of the milling cutter 20 during a milling operation. The cutting section 24 according to this embodiment is tapered (or conical), having a varying transverse cross-section thereof, diminishing from the shank section 22 to an end of the cutting section 24, preferably terminating in a rounded and more specifically, a hemispherical tip 27. Other details of the cutting section 24 are not shown in FIG. 1, but will be further described with reference to FIGS. 2 and 4 hereinafter. The tapered cutting section 24 with the hemispherical tip 27 (usually referred to as a ball end) is applied to an airfoil 14 in a milling operation. The milling cutter 20 has a substantially radial orientation with a small tangential inclination (with respect to the IBR 10). The cutting section 24 is moved to make successive passes at respective heights along the airfoil 14 in order to form the desired geometry of the airfoil 14. Therefore, the cutting section 24 should have a transverse cross-section smaller than the circumferential space defined between adjacent airfoils 14 in order to allow the milling cutter 24 to be operated between the adjacent airfoils 14 of the IBR 10.

It is understood that tool geometry without appropriate optimization can cause serious problems during the cutting operations, such as excessive vibration, tool breakage, compromised tool surface finishing quality, damage to the airfoil, tool, tool holder and spindle bearings of the milling machine, etc. Particularly in a flank milling operation of IBR's, cutting tool geometry must be appropriately optimized in order to have stable cutting operation which are required for extremely deep cuts in a flank milling of an IBR. Therefore, milling cutters for machining IBR's are conventionally optimized with, for example, tool envelope geometry, cutting edge geometry and rake angle, clearance angles, etc. All of these optimizations play very important roles in pushing the flank milling applications to an upper limit of performance.

The present invention is directed to further optimizing a milling cutter with the helix angle of cutting edges which plays a very important role on the chip thickness and cutting force directions, and thus affects the stability of the process with regard to the deflection of the tool and the part. Part deflection is very critical, especially for IBR machining processes. These features will be further discussed with reference to the embodiments of the present invention below.

Figures 2, 3:
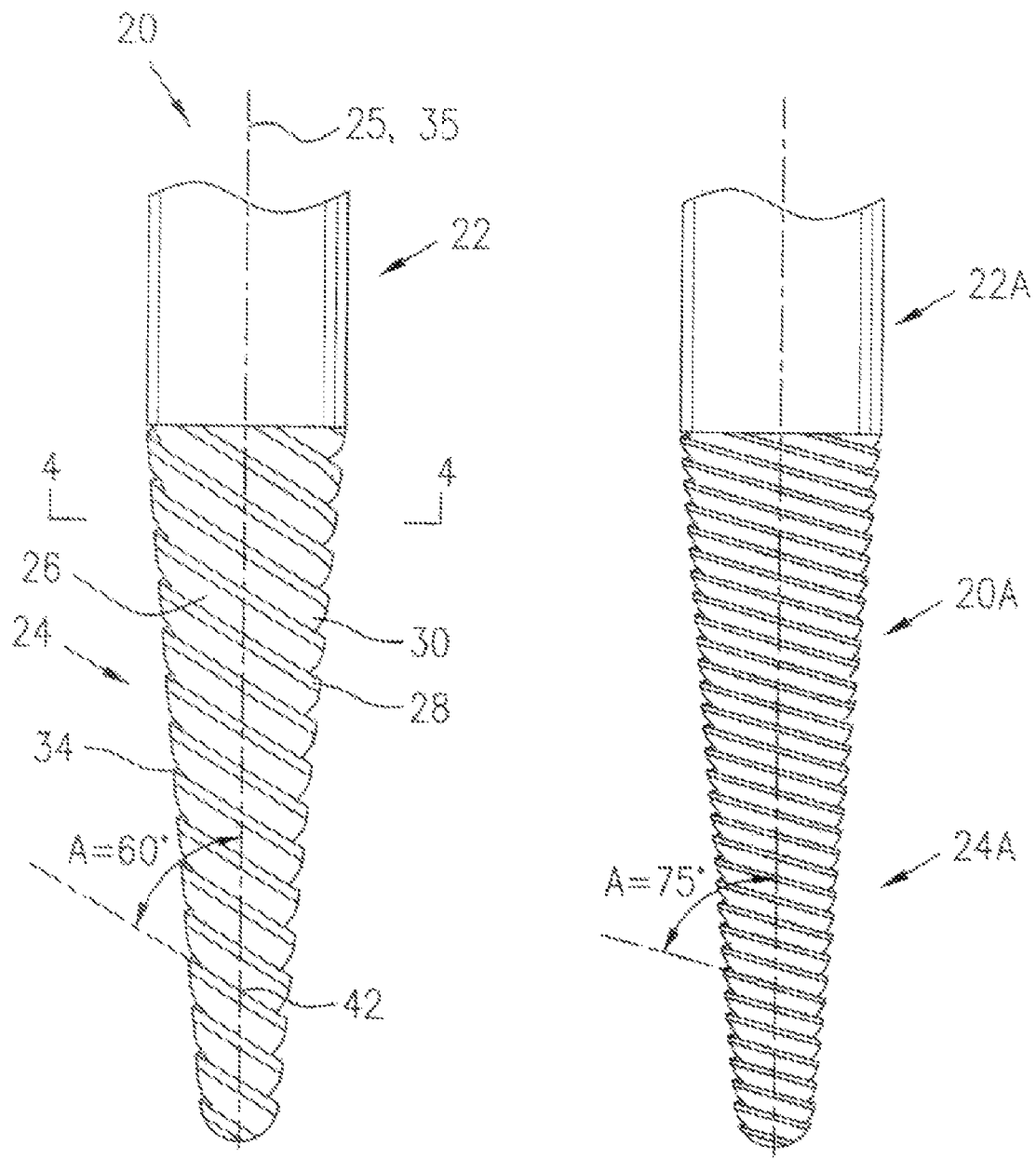
FIG. 2 is a side elevational view of a milling cutter in accordance with one embodiment of the present invention.
FIG. 3 is a side elevational view of a milling cutter in accordance with another embodiment of the present invention.
Figure 4:
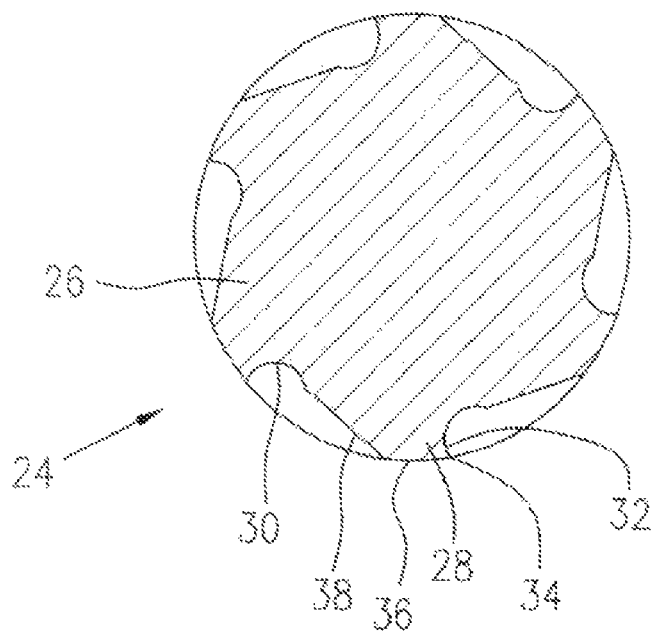
FIG. 4 is a cross-sectional view take along line 4-4 of FIG. 2, showing the peripheral details of a cutting section of the milling cutter.

As illustrated in FIGS. 2 and 4, the cutting section 24 of the milling cutter 20 includes a hard metal body 26 preferably integrated with the shank section 22 as a one-piece tool. The hard metal body 26 of the cutting section 24 defines a plurality of peripheral blades 28 separated by a plurality of flutes 30. In this particular embodiment, the number of respective blades 28 and flutes 30 is six. Each of the peripheral blades 28 preferably includes a leading side 32, a cutting edge 34 on the leading side 32, a land 36 and a trailing face side 38.

In a cross-section as shown in FIG. 4, the leading side 32 of the blade 28 extends from the cutting edge 34 towards and is smoothly connected with a concavely curved bottom (not indicated) of an adjacent flute 30. The land 36 is a circumferential section of the circular periphery of the hard metal body 26 of the cutting section 24, and extends between the cutting edge 34 and an adjacent flute 30 located circumferentially therebehind. The land 36 functions to support and strengthen the cutting edge 34 against cutting forces. The trailing face side 38 extends between the land 36 of the blade 28 and the concavely curved bottom of another adjacent flute 30 located circumferentially behind that blade 28.

The respective blades 28 and flutes 30, and thus each of the cutting edges 34, extend around the cutting section 24 in a helix direction, and define a helix angle A between the cutting edge 34 and a line 35 which extends parallel to the longitudinal axis 25 of the milling cutter 20 of FIG. 1, intersecting the cutting edge 34. This line 35 in FIG. 2 is superposed with the longitudinal axis 25 of the milling cutter. The helix angle A is determined such that an axial cutting force acting on the cutting edge is greater than other cutting forces acting on the same cutting edge which are in a plane normal to the axial cutting force, for example, at an angle of 50 to 89 degrees, preferably 55 to 75 degrees. In this particular embodiment, the helix angle A is about 60 degrees. This will be further discussed with reference to FIG. 5 hereinafter.

When the diameter of the helix is determined, the greater the helix angle (also referred to as higher helix), the smaller the lead of the helix (also referred to as lower lead of the helix). Therefore, in contrast to the conventional milling cutter, the present invention is a relatively high helix/low lead cutting tool. A lead of a helix is defined as an axial distance that an object travels along a particular helix in the course of one complete circumference. When a helix angle is determined, the lead of the helix depends on the diameter of the helix: the larger the diameter of the helix, the larger the lead of the helix for the same helix angle. In the case of a tapered cutting section 24, the diameter of the cross-section of the hard metal body 26 of the cutting section 24 increases from the hemispherical tip 27 towards the cylindrical shank section 22 and therefore the lead of the respective helical blades 28, flutes 30 and thus cutting edges 34, will vary, which results in varying axial dimensions of the respective flutes 30. Therefore, in this embodiment, the helix angle A of the respective cutting edges 34 is preferably inconsistent: varying according to the tapering angle of the cutting section 24, in order to provide a consistent lead of the respective helical cutting edges 34, and thus a consistent axial dimension of the respective flutes 30. This also means that the axial distance between adjacent cutting edges 34 is consistent. Therefore, the helix angle A will be slightly larger than 60 degrees at a point closer to the cylindrical shank section 22 than at a point 42 closer to the hemispherical tip 27, as illustrated in FIG. 2.

It should be understood that the angle variation of the helix angle A of the respective helical blades 28, flutes 30 and thus the cutting edges 34, are all the same. However, it should also be understood that sometimes milling cutters with an equal and consistent helix angle may be desirable.

FIG. 3 illustrates a milling cutter 20A in accordance with another embodiment of the present invention, similar to the milling cutter 20 of FIGS. 1, 2 and 4, showing a larger helix angle A which is about 75 degrees. In all other respects the milling cutter 20A is similar to milling cutter 20 and will not therefore be redundantly described herein.

Figure 5:
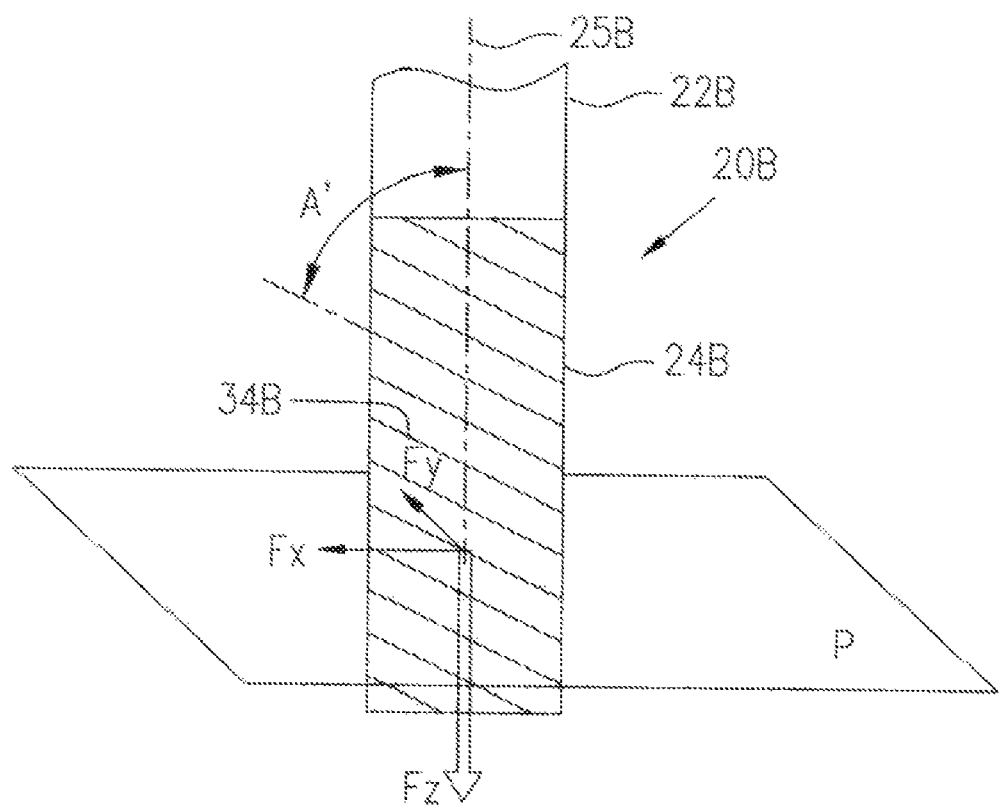
FIG. 5 is a schematic illustration of a milling cutter in accordance with a further embodiment of the present invention, illustrating cutting forces acting on a cutting edge of the milling cutter.

In FIG. 5, a milling cutter 20B according to a further embodiment of the present invention is schematically illustrated and includes a substantially cylindrical shank section 22B joined by a substantially cylindrical cutting section 24B, adapted to rotate about a longitudinal axis 25B of the milling cutter 20B. The milling cutter 20B is similar to milling cutter 20 of FIGS. 1, 2 and 4 except that the cutting section 24B is not tapered and has a relatively flat end thereof. Other features of the cutting section 24B are similar to those of cutting section 24 of the milling cutter of FIGS. 1, 2 and 4, and will not be redundantly described. The cutting edges 34B represented by the helical lines, define the helical angle A' which in similarity to the helical angle A of the milling cutter 20 of FIGS. 1, 2 and 4, is selected from an angle range of between 50 to 89 degrees, preferably between 55 to 75 degrees. However, in contrast to the helix angle A of the milling cutter 20 of FIGS. 1, 2 and 4, the helix angle A' of the respective cutting edges 34B of the milling cutter 22B, is consistent along the length of the cylindrical cutting section 24B because the respective cutting edges 34B extend around the cylindrical cutting section 24B which has a consistent diameter along the axial axis thereof.

The helix angle of the cutting edges plays a very important role in chip thickness and cutting force directions during a milling operation, which significantly affects the stability of the milling process and the deflection of the milling cutter and the part (the airfoils of IBR's 10). Part deflection is very critical especially for an IBR machining process. A cutting force direction can be controlled with the helix angle of the cutting edge. As illustrated in FIG. 5, the total cutting force (not shown) acting on the cutting edge 34B can be divided into an axial cutting force Fz which is substantially parallel to the longitudinal axis 25B of the milling cutter 20B, and two cutting forces Fx and Fy acting in a plane P which is normal to axial cutting force Fz and the longitudinal axis 25B. It should be understood that the milling cutter 20B, as an example of cutting tools similar to those of FIGS. 1-4 and the airfoils 14 of the IBR 10 of FIG. 1, are more rigid in the axial direction of the milling cutter 20B (the direction of the longitudinal axis 25B and the radial direction of the IBR 10 of FIG. 1) than in the radial directions of the milling cutter 20B defined in the plane P. When the helix angle A' of the cutting edge 24B increases, cutting force Fz increases proportionally while cutting forces Fx and Fy decrease provided that other cutting conditions are unchanged. It is desirable to increase the cutting force Fz and to decrease cutting forces Fx and Fy in order to reduce deflection of both cutting tool and the part during the milling operation.

It is also another advantage of the present invention that higher helix angles of cutting edges with the same number of flutes (or blades) will also give more contact points along the axial direction of the cutting section of the milling cutters because of lower leads of cutting edges, which also means smaller axial distances between adjacent cutting edges. This results in more process damping at a relatively low rpm milling operation, which is the usual case in titanium, and nickel based material flank milling applications.

The present invention is applicable to milling tools for machining IBR's in a flank milling operations, semi-finishing and/or finishing operations. It should also be understood that the present invention is also applicable to other milling cutters adapted to machine work pieces other than IBR's of gas turbine engines.

The above description is meant to be exemplary only, and one skilled in the art will recognize that changes may be made to the embodiments described without departure from the scope of the invention disclosed. For example, the cutting section of the milling cutters may include other features not shown in the above-described embodiments of may be configured with a geometry having details different from those described. It is also understood that although one type of IBR of gas turbine engines is illustrated in the drawings for description of the embodiment of the present invention, this invention can be equally applicable to the machining of airfoils of other types of IBR's such as an impeller, or even work pieces other than IBR's. Still other modifications which fall within the scope of the present invention will be apparent to those skilled in the art, in light of a review of this disclosure, and such modifications are intended to fall within the appended claims.

The invention claimed is:

1. A milling cutter comprising a shank section joined to a cutting section, the milling cutter being adapted to rotate about a longitudinal axis of the milling cutter during a milling operation, the cutting section including a hard metal body with a plurality of peripheral blades separated by a plurality of flutes, each of the peripheral blades having a leading side, a cutting edge and a trailing face side, each of the cutting edges defining a helix around the cutting section, a helix angle between the cutting edge and a line parallel to the longitudinal axis of the milling cutter being 50 to 89 degrees.

2. The milling cutter as defined in claim 1 wherein the helix angle is 55 to 75 degrees.

3. The milling cutter as defined in claim 2 wherein the shank section is substantially cylindrical.

4. The milling cutter as defined in claim 3 wherein the cutting section is substantially cylindrical.

5. The milling cutter as defined in claim 4 wherein the respective cutting edges have an equal and consistent helix angle.

6. The milling cutter as defined in claim 2 wherein the cutting section is tapered, having a varying transverse cross-section diminishing from the shank section to an end of the cutting section.

7. The milling cutter as defined in claim 6 wherein the respective cutting edges have a varying helix angle, thereby providing a consistent axial distance between adjacent cutting edges.

8. The milling cutter as defined in claim 2 wherein the cutting section comprises a ball end thereof.

9. A milling cutter for machining an Integrally Bladed Rotor (IBR) having a rotor disc with a plurality of integral airfoils projecting outwardly from the rotor disc, the milling cutter comprising a shank section joined to a cutting section, the milling cutter being adapted to rotate about a longitudinal axis of the milling cutter during a milling operation, the cutting section including a hard metal body with a plurality of peripheral blades separated by a plurality of flutes, the cutting section having a transverse cross-section smaller than a circumferential space defined between adjacent airfoils, each of the peripheral blades having a leading side, a cutting edge and a trailing face side, each of the cutting edges extending around the cutting section in a helix direction and defining an helix angle between the cutting edge and a line parallel to the longitudinal axis of the milling cutter, the helix angle being determined such that an axial cutting force acting on each of the cutting edges is greater than a force resulting from other cutting forces acting on the same cutting edge and in a plane normal to the axial cutting force.

10. The milling cutter as defined in claim 9 wherein the helix is 50 to 89 degrees.

11. The milling cutter as defined in claim 9 wherein the helix is 55 to 75 degrees.

\* \* \* \* \*